United States Patent
Oguchi et al.

(10) Patent No.: US 9,745,486 B2
(45) Date of Patent: Aug. 29, 2017

(54) INK JET INK SET FOR SUBLIMATION TRANSFER, DYED PRODUCT, AND MANUFACTURING METHOD THEREOF

(71) Applicant: Seiko Epson Corporation, Tokyo (JP)

(72) Inventors: Hideki Oguchi, Fujimi (JP); Akihito Sao, Matsumoto (JP); Yasunari Ikeda, Shiojiri (JP); Miho Nakamura, Shiojiri (JP); Shinichi Naito, Chino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/716,274

(22) Filed: May 19, 2015

(65) Prior Publication Data
US 2015/0337153 A1 Nov. 26, 2015

(30) Foreign Application Priority Data
May 20, 2014 (JP) .................. 2014-104056

(51) Int. Cl.
| C09D 11/40 | (2014.01) |
| C09D 11/38 | (2014.01) |
| C09D 11/328 | (2014.01) |
| B41M 5/025 | (2006.01) |
| B41M 5/035 | (2006.01) |
| B41J 2/01 | (2006.01) |
| B44C 1/17 | (2006.01) |
| D06P 1/16 | (2006.01) |
| D06P 5/02 | (2006.01) |
| D06P 5/28 | (2006.01) |
| D06P 5/30 | (2006.01) |
| C08K 5/08 | (2006.01) |
| C08K 5/3437 | (2006.01) |

(52) U.S. Cl.
CPC .............. *C09D 11/40* (2013.01); *C08K 5/08* (2013.01); *C08K 5/3437* (2013.01); *C09D 11/328* (2013.01); *C09D 11/38* (2013.01); *D06P 5/004* (2013.01); *B41M 5/0256* (2013.01); *B41M 5/035* (2013.01); *D06P 1/16* (2013.01); *D06P 5/30* (2013.01); *Y10T 428/24802* (2015.01)

(58) Field of Classification Search
CPC ....... C09D 11/328; C09D 11/38; C09D 11/40; B41M 5/0256; B41M 5/0356; B44C 1/17; B41J 2/01; D06P 1/16; D06P 5/004; D06P 5/30; Y10T 428/24802
USPC ................ 106/31.27, 31.44; 8/471; 427/394; 428/195.1; 347/102
See application file for complete search history.

(56) References Cited

U.S. PATENT DOCUMENTS

| 5,382,561 A * | 1/1995 | Mori ..................... B41M 5/345 428/913 |
| 8,709,103 B2 * | 4/2014 | Oguchi .................. D06P 5/004 8/471 |
| 9,109,327 B2 * | 8/2015 | Mizutaki .................. D06P 5/30 |
| 9,222,217 B2 * | 12/2015 | Ikeda ..................... D06P 5/004 |
| 9,399,718 B2 * | 7/2016 | Ikeda .................. C09D 11/328 |
| 9,534,128 B2 * | 1/2017 | Oguchi ................. C09D 11/40 |
| 2006/0185099 A1 * | 8/2006 | Chevli ................ B41M 5/0256 8/471 |
| 2015/0130881 A1 * | 5/2015 | Oguchi ................. C09D 11/40 106/31.44 |
| 2015/0275012 A1 * | 10/2015 | Ikeda .................. C09D 11/328 106/31.13 |
| 2015/0337152 A1 * | 11/2015 | Oguchi ................ B41M 5/0356 428/195.1 |
| 2015/0353752 A1 * | 12/2015 | Numakura ........... C09D 11/328 428/207 |

FOREIGN PATENT DOCUMENTS

| JP | 10/130524 A | * | 5/1998 |
| JP | 2005/248105 A | * | 9/2005 |
| JP | 2005/263835 A | * | 9/2005 |
| JP | 2005-272518 A | | 10/2005 |
| JP | 2006/063170 A | * | 3/2006 |
| JP | 2011/021133 A | * | 2/2011 |

OTHER PUBLICATIONS

English translation JP 2011/021133, Feb. 2011; 28 pages.*
English translation JP 2005/248105, Sep. 2005; 16 pages.*
English translation JP 2005/263835, Sep. 2005; 11 pages.*
English translation JP 2006/063170, Mar. 2006; 15 pages.*
English translation JP 10/130524, May 1998; 10 pages.*

* cited by examiner

*Primary Examiner* — Helene Klemanski
(74) *Attorney, Agent, or Firm* — Harness, Dickey & Pierce, P.L.C.

(57) ABSTRACT

There is provided an ink jet ink set for sublimation transfer, including: a first ink composition containing a first disperse dye and a first dispersant; and a second ink composition containing a second disperse dye and a second dispersant, in which the first disperse dye is the same as the second disperse dye, the content of the first disperse dye in the first ink composition is equal to or greater than the content of the second disperse dye in the second ink composition, the ratio A of the content of the first disperse dye in the first ink composition to the content of the first dispersant in the first ink composition is equal to or greater than the ratio B of the content of the second disperse dye in the second ink composition to the content of the second dispersant in the second ink composition.

15 Claims, No Drawings

INK JET INK SET FOR SUBLIMATION TRANSFER, DYED PRODUCT, AND MANUFACTURING METHOD THEREOF

BACKGROUND

1. Technical Field

The present invention relates to an ink jet ink set for sublimation transfer, and a dyed product and a manufacturing method thereof.

2. Related Art

Ink jet recording methods have been rapidly developed in many areas because high-definition images can be recorded by a relatively simple apparatus. Among these methods, various examinations for obtaining a dyed product having higher image quality have been conducted. For example, for the purpose of providing an ink jet ink set for printing, which is applied to a high-quality ink jet printing print having excellent printing stability and high toughness and having no color unevenness with high image quality, JP-A-2005-272518 discloses an ink jet ink set for printing, which has a combination of deep-colored ink and light-colored ink containing the same disperse dye, and in which the ratio (deep color/light color) of an absorbance residual rate of deep color ink and light color ink is 0.7 to 1.7, and, in the ratio of a dispersant to a disperse dye, light color ink has a larger ratio than deep color ink.

Meanwhile, in order to improve the graininess (which results from the occurrence of shading in color development in the pattern inside) of a light color portion of a dyed product, it is considered to use a deep color ink composition and a light color ink composition which are different from each other in the concentration of a color material. However, since the light color ink composition has a high dilution rate of a dispersant in water, a dispersant is easily separated from the surface of a color material, and, as a result, the color material is aggregated, and thus the particle diameter of the color material becomes large. Therefore, the light color ink composition, compared to the deep color ink composition, is problematic in that clogging of nozzles more easily occurs, and the clogging thereof is not recovered (clogging recovery performance is poor) even when the nozzles are cleaned.

In order to solve this problem, it is proposed in JP-A-2005-272518 to increase the content of a dispersant in the light color ink composition. However, there is a case in which an ink composition containing a small amount of a dispersant is exuded into an ink composition containing a large amount of a dispersant, and there is a problem in that a deep color ink composition is exuded into a light color ink composition on a dyed product.

SUMMARY

An advantage of some aspects of the invention is to provide an ink jet ink set for sublimation transfer, from which a dyed product having suppressed bleeding and graininess can be obtained, and to provide a dyed product and a manufacturing method thereof.

The present inventors have conducted intensive studies. As a result, they have found that the invention can be realized by using predetermined light color ink and deep color ink, thus completing the invention.

That is, the invention is as follows.

[1] According to an aspect of the invention, there is provided an ink jet ink set for sublimation transfer, including: a first ink composition containing a first disperse dye and a first dispersant; and a second ink composition containing a second disperse dye and a second dispersant, in which the first disperse dye is the same as the second disperse dye, the content of the first disperse dye in the first ink composition is equal to or greater than the content of the second disperse dye in the second ink composition, the ratio A of the content of the first dispersant in the first ink composition to the content of the first disperse dye in the first ink composition is equal to or greater than the ratio B of the content of the second dispersant in the second ink composition to the content of the second disperse dye in the second ink composition, and each of the first dispersant and the second dispersant contains at least one compound selected from the group consisting of lithium and potassium salts of aromatic sulfonic acid, lithium and potassium salts of aromatic sulfonic acid-formalin condensates, lithium and potassium salts of β-naphthalenesulfonic acid, and lithium and potassium salts of β-naphthalenesulfonic acid-formalin condensates.

[2] In the ink jet ink set for sublimation transfer according to [1], each of the first ink composition and the second ink composition may be any one of magenta ink, cyan ink, and black ink.

[3] In the ink jet ink set for sublimation transfer according to [1] or [2], the ratio of the content of the second disperse dye in the second ink composition to the content of the first disperse dye in the first ink composition may be 5.0% to 50%.

[4] In the ink jet ink set for sublimation transfer according to any one of [1] to [3], each of the ratio A and the ratio B may be 50% to 200%.

[5] In the ink jet ink set for sublimation transfer according to any one of [1] to [4], each of the first dispersant and the second dispersant may further contain at least one compound selected from the group consisting of sodium salts of aromatic sulfonic acid, sodium salts of aromatic sulfonic acid-formalin condensates, sodium salts of β-naphthalenesulfonic acid, and sodium salts of β-naphthalenesulfonic acid-formalin condensates.

[6] According to another aspect of the invention, there is provided a method of manufacturing a dyed product, including: adhering the first ink composition and the second ink composition included in the ink jet ink set for sublimation transfer according to any one of [1] to [5] to an intermediate transfer medium using an ink jet method; and heating a surface of the intermediate transfer medium, the surface being adhered with the first ink composition and the second ink composition, and a dyed surface of a recording medium with these surfaces facing each other to transfer the disperse dye contained in the first ink composition and the second ink composition to the recording medium.

[7] According to another aspect of the invention, there is provided a dyed product, which is obtained using the ink jet ink set for sublimation transfer according to any one of [1] to [5].

DESCRIPTION OF EXEMPLARY EMBODIMENTS

Hereinafter, an embodiment of the invention (hereinafter, referred to as "present embodiment") will be described in detail, but the invention is not limited thereto. Various modifications can be made within the scope not departing from the gist thereof.

Ink Jet Ink Set for Sublimation Transfer

The ink jet ink set for sublimation transfer according to the present embodiment includes: a first ink composition containing a first disperse dye and a first dispersant; and a second ink composition containing a second disperse dye and a second dispersant, in which the first disperse dye is the same as the second disperse dye, the content of the first disperse dye in the first ink composition is equal to or greater than the content of the second disperse dye in the second ink composition, the ratio A of the content of the first dispersant in the first ink composition to the content of the first disperse dye in the first ink composition is equal to or greater than the ratio B of the content of the second dispersant in the second ink composition to the content of the second disperse dye in the second ink composition, and each of the first dispersant and the second dispersant contains at least one compound selected from the group consisting of lithium and potassium salts of aromatic sulfonic acid, lithium and potassium salts of aromatic sulfonic acid-formalin condensates, lithium and potassium salts of β-naphthalenesulfonic acid, and lithium and potassium salts of β-naphthalenesulfonic acid-formalin condensates.

In the invention, a lithium or potassium salt having high affinity for a disperse dye is used as a dispersant, thus suppressing the aggregation of a color material in the second ink composition. In addition, a lithium or potassium salt is used as a dispersant, thus suppressing the exudation of the first ink composition into the second ink composition on a dyed product.

Here, the above description that the first disperse dye is the same as the second disperse dye means that 95% or more, and preferably, 98% or more of disperse dye components are composed of dyes having the same structure. Each of the first disperse dye and the second disperse dye may contain similar structures or inevitable impurities.

First Ink Composition

The first ink composition contains a first disperse dye and a first dispersant.

First Disperse Dye

The first disperse dye is not particularly limited, but examples thereof are as follows.

Yellow disperse dye is not particularly limited, but examples thereof include C.I. Disperse Yellows 3, 4, 5, 7, 9, 13, 23, 24, 30, 33, 34, 42, 44, 49, 50, 51, 54, 56, 58, 60, 63, 64, 66, 68, 71, 74, 76, 79, 82, 83, 85, 86, 88, 90, 91, 93, 98, 99, 100, 104, 108, 114, 116, 118, 119, 122, 124, 126, 135, 140, 141, 149, 160, 162, 163, 164, 165, 179, 180, 182, 183, 184, 186, 192, 198, 199, 202, 204, 210, 211, 215, 216, 218, 224, 227, 231, and 232.

Orange disperse dye is not particularly limited, but examples thereof include C.I. Disperse Oranges 1, 3, 5, 7, 11, 13, 17, 20, 21, 25, 29, 30, 31, 32, 33, 37, 38, 42, 43, 44, 45, 46, 47, 48, 49, 50, 53, 54, 55, 56, 57, 58, 59, 61, 66, 71, 73, 76, 78, 80, 89, 90, 91, 93, 96, 97, 119, 127, 130, 139, and 142.

Red disperse dye is not particularly limited, but examples thereof include C.I. Disperse Reds 1, 4, 5, 7, 11, 12, 13, 15, 17, 27, 43, 44, 50, 52, 53, 54, 55, 56, 58, 59, 60, 65, 72, 73, 74, 75, 76, 78, 81, 82, 86, 88, 90, 91, 92, 93, 96, 103, 105, 106, 107, 108, 110, 111, 113, 117, 118, 121, 122, 126, 127, 128, 131, 132, 134, 135, 137, 143, 145, 146, 151, 152, 153, 154, 157, 159, 164, 167, 169, 177, 179, 181, 183, 184, 185, 188, 189, 190, 191, 192, 200, 201, 202, 203, 205, 206, 207, 210, 221, 224, 225, 227, 229, 239, 240, 257, 258, 266, 277, 278, 279, 281, 288, 298, 302, 303, 310, 311, 312, 320, 324, and 328.

Violet disperse dye is not particularly limited, but examples thereof include C.I. Disperse Violets 1, 4, 8, 23, 26, 27, 28, 31, 33, 35, 36, 38, 40, 43, 46, 48, 50, 51, 52, 56, 57, 59, 61, 63, 69, and 77.

Green disperse dye is not particularly limited, but an example thereof includes C.I. Disperse Green 9.

Brown disperse dye is not particularly limited, but examples thereof include C.I. Disperse Browns 1, 2, 4, 9, 13, and 19.

Blue disperse dye is not particularly limited, but examples thereof include C.I. Disperse Blues 3, 7, 9, 14, 16, 19, 20, 26, 27, 35, 43, 44, 54, 55, 56, 58, 60, 62, 64, 71, 72, 73, 75, 79, 81, 82, 83, 87, 91, 93, 94, 95, 96, 102, 106, 108, 112, 113, 115, 118, 120, 122, 125, 128, 130, 134, 139, 141, 142, 143, 146, 148, 149, 153, 154, 158, 165, 167, 171, 173, 174, 176, 181, 183, 185, 186, 187, 189, 197, 198, 200, 201, 205, 207, 211, 214, 224, 225, 257, 259, 266, 267, 268, 270, 284, 285, 287, 288, 291, 293, 295, 297, 301, 315, 330, 333, 359, and 360.

Black disperse dye is not particularly limited, but examples thereof include C.I. Disperse Blacks 1, 3, 10, and 24.

The content of the first disperse dye is preferably 2.0 mass % to 8.0 mass %, and more preferably 3.0 mass % to 7.0 mass %, based on the total amount of the first ink composition. When the content of the first disperse dye is 2.0 mass % or more, the optical density of the dyed product to be obtained tends to be further improved. Further, when the content of the first disperse dye is 8.0 mass % or less, storage stability tends to be further improved. Here, the content of the first disperse dye in the first ink composition is equal to or greater than the content of the second disperse dye in the second ink composition.

First Dispersant

The first dispersant contains at least one compound selected from the group consisting of lithium and potassium salts of aromatic sulfonic acid, lithium and potassium salts of aromatic sulfonic acid-formalin condensates, lithium and potassium salts of β-naphthalenesulfonic acid, and lithium and potassium salts of β-naphthalenesulfonic acid-formalin condensates.

The aromatic sulfonic acid is not particularly limited, but examples thereof include alkyl naphthalene sulfonic acid, such as creosote oil sulfonic acid, cresol sulfonic acid, phenol sulfonic acid, β-naphthol sulfonic acid, methyl naphthalene sulfonic acid, and butyl naphthalene sulfonic acid; a mixture of β-naphthalene sulfonic acid and β-naphthol sulfonic acid; a mixture of cresol sulfonic acid and 2-naphthol-6-sulfonic acid; and lignin sulfonic acid.

Among these, preferably, the first dispersant contains at least one selected from the group consisting of lithium and potassium salts of β-naphthalenesulfonic acid-formalin condensates, and lithium and potassium salts of lignin sulfonic acid. Further, among these, lithium salts are more preferable. In this case, a dyed product in which bleeding is further suppressed tends to be obtained.

In addition, the first dispersant may contain at least one compound selected from the group consisting of sodium salts of aromatic sulfonic acid, sodium salts of aromatic sulfonic acid-formalin condensates, sodium salts of β-naphthalenesulfonic acid, and sodium salts of β-naphthalenesulfonic acid-formalin condensates. When the first dispersant further contains these compounds, storage stability tends to be further improved.

Second Ink Composition

The second ink composition contains a second disperse dye and a second dispersant.

Second Disperse Dye

The second disperse dye is the same as the first disperse dye. The content of the second disperse dye is preferably 0.10 mass % to 4.5 mass %, and more preferably 0.20 mass % to 4.0 mass %, based on the total amount of the second ink composition. When the content of the second disperse dye is 0.10 mass % or more, the optical density of the dyed product to be obtained tends to be further improved. Further, the content of the second disperse dye is 4.5 mass % or less, graininess tends to be further suppressed. Here, the content of the second disperse dye in the second ink composition is equal to or less than the content of the first disperse dye in the first ink composition.

Second Dispersant

The second dispersant is not particularly limited, but examples thereof may be used as the same examples of the first dispersant. The second dispersant and the first dispersant may be the same as each other, or may be different from each other.

Among these, preferably, the second dispersant contains at least one selected from the group consisting of lithium and potassium salts of β-naphthalenesulfonic acid-formalin condensates, and lithium and potassium salts of lignin sulfonic acid. Further, among these, lithium salts are more preferable. In this case, the aggregation of a color material tends to be further suppressed, and clogging recovery performance tends to be further improved.

It is preferable that each of the first ink composition and the second ink composition is any one of magenta ink, cyan ink, and black ink. When each of the first ink composition and the second ink composition is any one of these ink compositions, the graininess of the dyed product to be obtained tends to be further improved.

Ratio A

The ratio A of the content of the first dispersant in the first ink composition to the content of the first disperse dye in the first ink composition is preferably 50% to 200%, more preferably 50% to 150%, and still more preferably 75% to 125%. When the ratio A is 50% or greater, dispersion stability tends to be further improved, and clogging recovery performance tends to be further improved. Further, when the ratio A is 200% or less, it is possible to suppress the viscosity increase occurring at the time of evaporating water in ink, and clogging recovery performance tends to be further improved.

Ratio B

The ratio B of the content of the second disperse dye in the second ink composition to the content of the second disperse dye in the second ink composition is preferably 50% to 200%, more preferably 50% to 150%, and still more preferably 75% to 125%. When the ratio B is 50% or greater, dispersion stability tends to be further improved, and clogging recovery performance tends to be further improved. Further, when the ratio B is 200% or less, the exudation of the dyed product to be obtained tends to be further suppressed.

Ratio C

The ratio A is equal to or greater than the ratio B. The ratio C (ratio A/ratio B) of ratio A to ratio B is preferably 1.0 to 2.0, more preferably 1.0 to 1.5, and still more preferably 1.0 to 1.3. When the ratio C is 1.0 or greater, the exudation of the dyed product to be obtained tends to be further suppressed. Further, when the ratio C is 2.0 or less, clogging recovery performance tends to be further improved.

Ratio D

The ratio D of the content of the second disperse dye in the second ink composition to the content of the first disperse dye in the first ink composition is preferably 5.0% to 50%, more preferably 5.0% to 35%, and still more preferably 5.0% to 20%. When the ratio D is 5.0% or greater, the difference in optical density between a deep color portion and a light color portion on a dyed product becomes smaller, and thus the tone jump of color tends to be further suppressed. Further, when the ratio D is 50% or less, the difference in optical density between a deep color portion and a light color portion on a dyed product becomes larger, and thus graininess tends to be further improved.

Hereinafter, components, other than the disperse dye, contained in the first ink composition and the second ink composition (hereinafter, collectively referred to as "ink composition") will be described. Here, the respective components contained in the first ink composition and the second ink composition may be the same as each other or different from each other in the range in which the first ink composition and the second ink composition are distinguished from each other. In addition, the contents of the respective components may also be the same as each other or different from each other in the range in which the first ink composition and the second ink composition are distinguished from each other.

Water

The ink composition may contain water. The water is not particularly limited, but preferable examples thereof include pure water such as ion exchange water, ultrafiltered water, reverse osmosis water, and distilled water, and ultrapure water. Particularly, when water obtained by sterilizing this water through ultraviolet irradiation or addition of hydrogen peroxide is used, the occurrence of molds and bacteria tends to be prevented for a long period of time.

The content of water is preferably 50 mass % to 90 mass %, and more preferably 55 mass % to 85 mass %, based on the total amount of the ink composition.

Water-Soluble Organic Solvent

The ink composition may further contain at least one water-soluble organic solvent. When the ink composition contains a water-soluble organic solvent, the evaporation of water left in a head for a long time can be effectively suppressed, and simultaneously the wettability of the ink composition to an intermediate recording medium is increased, and thus the permeability of the ink composition is further improved, thereby further improving ejection stability and clogging recovery performance. As the water-soluble organic solvent, a compound generally used in ink as a water-soluble organic solvent can be used. Examples thereof include polyol compounds, glycol ethers, sugars, and betaine compounds.

As the polyol compound, a polyol compound (preferably, a diol compound) which has 2 to 6 carbon atoms in a molecule and which may have one ether bond in a molecule is exemplified. Specific examples thereof include glycerin, ethylene glycol, diethylene glycol, triethylene glycol, propylene glycol, dipropylene glycol, 1,3-propanediol, 1,2-butanediol, 1,3-butanediol, 1,4-butanediol, 2,3-butanediol, 3-methyl-1,3-butanediol, 1,2-pentanediol, 1,5-pentanediol, 2-methyl-2,4-pentanediol, 3-methyl-1,5-pentanediol, 1,2-hexane diol, and 1,6-hexane diol.

The glycol ether is preferably a monoalkyl ether of glycol selected from ethylene glycol, diethylene glycol, triethylene glycol, propylene glycol, dipropylene glycol, and tripropylene glycol. Specific examples thereof include triethylene glycol monomethyl ether, triethylene glycol monobutyl ether, and dipropylene glycol monopropyl ether.

Sugars refers to monosaccharides, disaccharides, oligosaccharides (including trisaccharides and tetrasaccharides), and polysaccharides. Example of sugars include homoglycans, such as threose, erythrose, erythrose, arabinose, ribulose, ribose, xylose, xylulose, lyxose, glucose, fructose, mannose, idose, sorbose, gulose, talose, tagatose, galactose, allose, psicose, altrose, maltose, isomaltose, cellobiose, lactose, sucrose, trehalose, isotrehalose, gentiobiose, melibiose, turanose, sophorose, isosaccharose, glucan, fructans, mannan, xylan, galacturonans, mannuronan, and N-acetyl glucosamine polymers; heteroglycans, such as diheteroglycan and triheteroglycan; and maltotriose, isomaltotriose, panose, maltotetraose, and maltopentaose. Preferably, trehalose is exemplifed.

The betaine compound refers to a compound (intramolecular salt) which has a positive charge and a negative charge at positions which are not adjacent to each other in the same molecule and in which a dissociable hydrogen atom is not bound to an atom having a positive charge and the entire molecule has no charge. The betaine compound is preferably an N-alkyl substitution product of amino acid, and more preferably an N-trialkyl substitution product of amino acid. Examples of the betaine compound include trimthylglycine (also, referred to as "glycine betaine"), γ-butyrobetaine, homarine, trigonelline, carnitine, homoserine betaine, betaine valine, lysine betaine, betaine ornithine, alanine betaine, stachydrine, and glutamic acid betaine. Preferably, trimethylglycine is exemplified.

The content of the water-soluble organic solvent is preferably 1 mass % to 40 mass %, and more preferably 5 mass % to 30 mass %, based on the total amount of the ink composition. When the content of the water-soluble organic solvent is within the above range, the evaporation of water left in a head for a long time can be effectively suppressed, and simultaneously the wettability of the ink composition to an intermediate transfer medium is increased, and thus the permeability of the ink composition is further improved, thereby further improving ejection stability and clogging recovery performance.

Surfactant

It is preferable that the ink composition used in the present embodiment contains a surfactant. The surfactant is not particularly limited, but, for example, is preferably at least one selected from among an acetylene glycol-based surfactant, a fluorine-based surfactant, and a silicone-based surfactant. When the ink composition contains these surfactants, the formation of ink droplets during ejection becomes better.

Among these, the silicone-based surfactant is more preferable in terms of increasing wettability to an ink flow path and further improving ejection characteristics.

The acetylene glycol-based surfactant is not particularly limited, but, for example, is preferably one or more selected from 2,4,7,9-tetramethyl-5-decyne-4,7-diol and an alkylene oxide adduct of 2,4,7,9-tetramethyl-5-decyne-4,7-diol, and 2,4-dimethyl-5-decyne-4-ol, and an alkylene oxide adduct of 2,4-dimethyl-5-decyne-4-ol. Commercially available products of the acetylene glycol-based surfactant are not particularly limited, but examples thereof include an Olfine 104 series or an E series such as Olfine E1010 (trade name, manufactured by Air Products Japan, Inc.), and Surfynol 465 or Surfynol 61 (trade name, manufactured by Nissin Chemical Industry Co., Ltd.). The acetylene glycol-based surfactant may be used alone or in a combination of two or more thereof.

The fluorine-based surfactant is not particularly limited, but examples thereof include perfluoroalkyl sulfonate, perfluoroalkyl carboxylate, perfluoroalkyl phosphate, a perfluoroalkyl ethylene oxide adduct, perfloroalkyl betaine, and a perfluoroalkyl amine oxide compound. Commercially available products of the fluorine-based surfactant are not particularly limited, but examples thereof include S-144 and S-145 (manufactured by Asahi Glass Co., Ltd.); Fluorad FC-170C, FC-430, and FC-4430 (manufactured by Sumitomo 3M, Ltd.); FSO, FSO-100, FSN, FSN-100, and FS-300 (manufactured by Dupont Co.); and FT-250 and FT-251 (Neos Co., Ltd.). The fluorine-based surfactant may be used alone or in a combination of two or more thereof.

Examples of the silicone-based surfactant include a polysiloxane-based compound, polyether-modified organosiloxane, and the like. Commercially available products of the silicone-based surfactant are not particularly limited, but specific examples thereof include BYK-306, BYK-307, BYK-333, BYK-341, BYK-345, BYK-346, BYK-347, BYK-348, and BYK-349 (trade name, manufactured by BYK Japan K.K.); and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all are trade name, manufactured by Shin-Etsu Chemical Co., Ltd.).

The content ratio of the surfactant is preferably 0.1 mass % to 5 mass %, and more preferably 0.1 mass % to 3 mass %, based on the total mass of the ink composition. When the content ratio of the surfactant is within the above range, the wettability of the ink composition adhered to the recording medium tends to be further improved.

Other Additives

The ink composition, if necessary, may contain an antiseptic agent, an antioxidant, an ultraviolet absorber, a chelating agent, an oxygen absorbing agent, a pH adjusting agent (for example, triethanol amine, adipic acid, potassium hydroxide), a dissolving aid, and other additives generally used in ink. Here, these additives may be used alone or in a combination of two or more thereof.

Method of Manufacturing Dyed Product

The method of manufacturing a dyed product according to the present embodiment includes: adhering the first ink composition and the second ink composition included in the ink jet ink set for sublimation transfer to an intermediate transfer medium using an ink jet method; and heating a surface of the intermediate transfer medium, the surface being adhered with the first ink composition and the second ink composition, and a dyed surface of a recording medium with these surfaces facing each other to transfer the disperse dye contained in the first ink composition and the second ink composition to the recording medium.

Adherence Process

The adherence process is a process of adhering the first ink composition and the second ink composition included in the ink jet ink set for sublimation transfer to an intermediate transfer medium through an ink jet method. The ejection of the ink composition using an ink jet method can be performed using a known ink jet recording apparatus. As the ejection method, a piezo method or a method of ejecting an ink using bubbles generated by heating the ink can be used. Among these, a piezo method is preferable from the viewpoint of the ink composition being difficult to degenerate.

In the ink adherence process, an ink composition, other than the ink composition according to the present embodiment, may be used. Thus, for example, a color gamut capable of being expressed can be made wider.

Intermediate Transfer Medium

The intermediate transfer medium is not particularly limited, but paper, such as plain paper, or a recording medium (referred to as "exclusive paper for ink jet" or "coat paper") provided with an ink absorbing layer can be used as the intermediate transfer medium. Among these, paper provided with an ink absorbing layer made of inorganic particles such as silica particles is preferable. Thus, in the process of drying the ink composition adhered to the intermediate transfer medium, it is possible to obtain an intermediate transfer medium with suppressed bleeding, and, in the subsequent transfer process, the sublimation of a disperse dye tends to easily proceed.

Transfer Process

The transfer process is a process of heating a surface of the intermediate transfer medium, the surface being adhered with the first ink composition and the second ink composition, and a dyed surface of a recording medium with these surfaces facing each other to transfer the disperse dye contained in the first ink composition and the second ink composition to the recording medium.

The heating temperature in the transfer process is not particularly limited, but is preferably 160° C. to 220° C., and more preferably 170° C. to 200° C. When the heating temperature is within the above range, the energy required for transfer can be further reduced, and the productivity of a dyed product tends to be more excellent. In addition, the color developing properties of the dyed product to be obtained tend to be more excellent.

The heating time in this process depends on the heating temperature, but is preferably 30 seconds to 90 seconds, and more preferably 45 seconds to 60 seconds. When the heating time is within the above range, the energy required for transfer can be further reduced, and the productivity of a dyed product tends to be more excellent. In addition, the color developing properties of the dyed product to be obtained tend to be more excellent.

Further, in this process, the surface of the intermediate transfer medium, the surface being adhered with the ink composition, can be heated in a state in which the intermediate transfer medium is spaced apart from the recording medium by a predetermined distance and faces the recording medium, or can also be heated in a state in which the intermediate transfer medium is in contact with the recording medium. Among these, it is preferable that the surface of the intermediate transfer medium is heated in a state in which the intermediate transfer medium is in contact with the recording medium. Thus, energy required for transfer can be further reduced, and the productivity of a dyed product tends to be more excellent. Further, in this process, since the positional deviation between the recording medium and the intermediate transfer medium is almost non-existent, a dyed product in which a dye is more accurately transferred to a desired position can be obtained, and the color developing properties of the dyed product to be obtained tend to be further improved.

Recording Medium

The recording medium is not particularly limited, but examples thereof include a fabric (hydrophobic fiber fabric or the like), a resin (plastic) film, paper, glass, metals, and ceramics. Further, as the recording medium, a medium having a three-dimensional shape such as a sheet shape, a spherical shape, or a rectangular shape may be used.

When the recording medium is a fabric, the fiber constituting the fabric is not particularly limited, but examples thereof include a polyester fiber, a nylon fiber, a triacetate fiber, a diacetate fiber, a polyamide fiber, and a blended fiber of two or more thereof. In addition, a recycled fiber, such as rayon, or a blended fiber of natural fibers such as cotton, silk, and wool may also be used.

Further, when the recording medium is a resin (plastic) film, the resin (plastic) film that can be used is nor particularly limited, but examples thereof include polyester film, polyurethane film, polycarbonate film, polyphenylene sulfide film, polyimide film, and polyamide-imide film. The resin (plastic) film may be a laminate of a plurality of layers, and may also be made of a gradient material whose composition gradually changes.

Other Processes

The method of manufacturing a dyed product according to the present embodiment may further include other processes (pre-treatment, intermediate treatment and post-treatment processes) in addition to the above-described processes.

The pre-treatment process in not particularly limited, but an example thereof includes a process of applying a coating layer onto a recording medium before the adherence process.

The intermediate treatment process in not particularly limited, but an example thereof includes a process of pre-heating the recording medium before an intermediate transfer process or before the transfer process.

The post-treatment process is not particularly limited, but an example thereof includes a process of cleaning the recording medium after the transfer process.

Meanwhile, the ink composition can be suitably used even in the sublimation transfer without using an intermediate transfer medium. The sublimation transfer done without using the intermediate transfer medium is not particularly limited, but an example thereof includes a method including: a process of adhering the ink composition of the present embodiment to a strippable ink absorbing layer provided on a recording medium (film product or the like) through an ink jet method; a process of directly heating the recording medium provided with the ink absorbing layer coated with the ink composition to perform sublimation, diffusion and staining from the ink absorbing layer to the recording medium located thereunder; and a process of separating the ink absorbing layer from the recording medium to obtain a dyed product.

The dyed product according to the present embodiment is obtained using the ink jet ink set for sublimation transfer, and, for example, is obtained through the method of manufacturing a dyed product. The graininess and bleeding of this dyed product are further suppressed.

EXAMPLES

Hereinafter, the invention will be described in more detail using Examples and Comparative Examples. The invention is not limited to the following Examples.

Materials of Ink Composition

The main materials for the ink compositions used in Examples and Comparative Examples below are as follows.
Color Material
DR60 (Disperse Red 60)
DB359 (Disperse Blue 359)
DY54 (Disperse Yellow 54)
Surfactant
BYK-348 (silicone-based surfactant, manufactured by BYK Japan KK.)
Dispersant
Li salt of lignin sulfonic acid
K salt of lignin sulfonic acid
Na salt of lignin sulfonic acid
Li salt of β-naphthalenesulfonic acid-formalin condensate
Water-Soluble Organic Solvent
Glycerin
Preparation of Ink Composition Materials are mixed in composition ratios (mass %) shown in Table 1 below to obtain ink compositions, respectively.

TABLE 1

| | Composition No. | Dye DR60 | Dye DB359 | Dye DY54 | Surfactant BYK-348 | Dispersant Li salt of lignin sulfonic acid | Dispersant K salt of lignin sulfonic acid | Dispersant Na salt of lignin sulfonic acid | Dispersant Li salt of β-naphthalenesulfonic acid-formalin condensate | Water-soluble organic solvent Glycerin | Water |
|---|---|---|---|---|---|---|---|---|---|---|---|
| First ink composition | M-1 | 6.0 | — | — | 0.8 | 6.00 | — | — | — | 15.0 | 72.2 |
| | M-2 | 6.0 | — | — | 0.8 | — | 6.00 | — | — | 15.0 | 72.2 |
| | M-3 | 6.0 | — | — | 0.8 | 3.00 | — | 3.00 | — | 15.0 | 72.2 |
| | M-4 | 6.0 | — | — | 0.8 | — | — | 6.00 | — | 15.0 | 72.2 |
| | M-5 | 6.0 | — | — | 0.8 | — | — | — | 6.00 | 15.0 | 72.2 |
| | M-6 | 6.0 | — | — | 0.8 | 12.00 | — | — | — | 15.0 | 66.2 |
| | C-1 | — | 4.0 | — | 0.8 | 4.00 | — | — | — | 15.0 | 76.2 |
| | C-2 | — | 4.0 | — | 0.8 | — | 4.00 | — | — | 15.0 | 76.2 |
| | C-3 | — | 4.0 | — | 0.8 | 2.00 | — | 2.00 | — | 15.0 | 76.2 |
| | C-4 | — | 4.0 | — | 0.8 | — | — | 4.00 | — | 15.0 | 76.2 |
| | K-1 | 2.0 | 4.0 | 1.0 | 0.8 | 7.00 | — | — | — | 15.0 | 70.2 |
| | K-2 | 2.0 | 4.0 | 1.0 | 0.8 | — | 7.00 | — | — | 15.0 | 70.2 |
| | K-3 | 2.0 | 4.0 | 1.0 | 0.8 | 3.50 | — | 3.50 | — | 15.0 | 70.2 |
| | K-4 | 2.0 | 4.0 | 1.0 | 0.8 | — | — | 7.00 | — | 15.0 | 70.2 |
| Second ink composition | LM-1 | 3.0 | — | — | 0.8 | 3.00 | — | — | — | 15.0 | 78.2 |
| | LM-2 | 0.6 | — | — | 0.8 | 0.60 | — | — | — | 15.0 | 83.0 |
| | LM-3 | 0.6 | — | — | 0.8 | — | 0.60 | — | — | 15.0 | 83.0 |
| | LM-4 | 0.6 | — | — | 0.8 | 0.30 | — | 0.30 | — | 15.0 | 83.0 |
| | LM-5 | 0.6 | — | — | 0.8 | — | — | 0.60 | — | 15.0 | 83.0 |
| | LM-6 | 0.6 | — | — | 0.8 | 6.00 | — | — | — | 15.0 | 77.6 |
| | LM-7 | 0.6 | — | — | 0.8 | — | — | — | 0.60 | 15.0 | 83.0 |
| | LM-8 | 0.6 | — | — | 0.8 | 1.20 | — | — | — | 15.0 | 82.4 |
| | LC-1 | — | 2.0 | — | 0.8 | 2.00 | — | — | — | 15.0 | 80.2 |
| | LC-2 | — | 0.4 | — | 0.8 | 0.40 | — | — | — | 15.0 | 83.4 |
| | LC-3 | — | 0.4 | — | 0.8 | — | 0.40 | — | — | 15.0 | 83.4 |
| | LC-4 | — | 0.4 | — | 0.8 | 0.20 | — | 0.20 | — | 15.0 | 83.4 |
| | LC-5 | — | 0.4 | — | 0.8 | — | — | 0.40 | — | 15.0 | 83.4 |
| | LC-6 | — | 0.4 | — | 0.8 | 4.00 | — | — | — | 15.0 | 79.8 |
| | LK-1 | 1.0 | 2.0 | 0.5 | 0.8 | 3.50 | — | — | — | 15.0 | 77.2 |
| | LK-2 | 0.2 | 0.4 | 0.1 | 0.8 | 0.70 | — | — | — | 15.0 | 82.8 |
| | LK-3 | 0.2 | 0.4 | 0.1 | 0.8 | — | 0.70 | — | — | 15.0 | 82.8 |
| | LK-4 | 0.2 | 0.4 | 0.1 | 0.8 | 0.35 | — | 0.35 | — | 15.0 | 82.8 |
| | LK-5 | 0.2 | 0.4 | 0.1 | 0.8 | — | — | 0.70 | — | 15.0 | 82.8 |
| | LK-6 | 0.2 | 0.4 | 0.1 | 0.8 | 7.00 | — | — | — | 15.0 | 76.5 |

Examples 1 to 16 and Comparative Examples 1 to 6

Graininess

An ink jet printer (PX-G930, manufactured by Seiko Epson Corporation) was filled with each of the above obtained ink compositions. Then, a head of the printer was filled with ink for sublimation transfer, and it was confirmed that there is no clogged nozzle and normal recording is possible. A gradation pattern of 20 gradations, in which the ejection amount of ink was changed from 5% to a maximum of 100%, was printed on an intermediate transfer medium (TRANSJET Classic, Cham Paper Co., Ltd.) using both the first ink composition and the second ink composition by this ink jet printer. Here, recording resolution was set to 1440×720 dpi, and printer operation environment was set to 25° C.

After printing, the presence or absence of graininess in a recording surface was confirmed by visual observation.

Evaluation Criteria

A: The graininess of the recording surface is not confirmed when the ejection amount of ink is 5%.
B: The graininess of the recording surface is confirmed when the ejection amount of ink is 5%, but is not confirmed when the ejection amount of ink is 10%.
C: The graininess of the recording surface is confirmed when the ejection amount of ink is 10%.

Bleeding

An ink jet printer (PX-G930, manufactured by Seiko Epson Corporation) was filled with each of the above obtained ink compositions. Then, a head of the printer was filled with ink for sublimation transfer, and it was confirmed that there is no clogged nozzle and normal recording is possible. A pattern, in which the ejection amount of the second ink composition is 100%, and a gradation pattern of 10 gradations, in which the ejection amount of the first ink composition was changed from 10% to a maximum of 100%, were respectively printed on an intermediate transfer medium (TRANSJET Classic, Cham Paper Co., Ltd.) such that these patterns are directly in contact with each other by this ink jet printer, so as to obtain an intermediate transfer medium. Here, recording resolution was set to 1440×720 dpi, printer operation environment was set to 25° C., and each of the patterns was printed by two.

Then, the ink-applied side of the intermediate transfer medium for sublimation transfer was closely attached to a fabric which is a white recording medium (polyester 100%, TAFTA, manufactured by Toray Industries Inc.) by the ink-applied side of one intermediate transfer medium of the two printed intermediate transfer mediums, and, in this state, the resultant product was heated and pressed at 200° C. for 60 seconds using a heat press machine (TP-608M, manufactured by Taiyoseiki Co., Ltd.), and sublimation transfer was performed to obtain each dyed product.

For both the intermediate transfer medium and the dyed product, the presence or absence of bleeding of the interface between the pattern of the second ink composition and the pattern of the first ink composition was confirmed by visual observation.

Evaluation criteria

A: Bleeding is not confirmed both on the dyed product and on the intermediate transfer medium.
B: Bleeding is not confirmed on the dyed product, but is confirmed on the intermediate transfer medium.
C: Bleeding is confirmed both on the dyed product and on the intermediate transfer medium.

Clogging Recovery Performance After High-Temperature Leaving

An ink jet printer (PX-G930, manufactured by Seiko Epson Corporation) was filled with each of the above obtained ink compositions. Then, a head of the printer was filled with ink for sublimation transfer, and it was confirmed that there is no clogged nozzle and normal recording is possible. Then, the head filled with the ink for sublimation transfer was left in an environment at 40° C. and 20 RH % for 48 hours at a position other than the home position (in a state of the head being deviated from the position of a cap provided in the printer and not being capped). After being left, the ink composition was ejected from all the nozzles again, and the number of cleanings required until printing was the same as initial printing was measured, and the results thereof were determined based on the following evaluation criteria.

Evaluation Criteria

A: The first ink composition and the second ink composition can be ejected from all of the nozzles at the same time and the nozzles eject these ink compositions when the number of cleanings performed is 3 or less times.
B: The first ink composition and the second ink composition can be ejected from all of the nozzles at the same time and the nozzles eject these ink compositions when the number of cleanings performed is 4 times to 6 times.
C: Clogging of some nozzles together with the nozzles ejecting the first ink composition and the second ink composition is not recovered even when cleaning is carried out 7 or more times.

The entire disclosure of Japanese Patent Application No. 2014-104056, filed May 20, 2014 is expressly incorporated by reference herein.

What is claimed is:

1. An ink jet ink set for sublimation transfer, comprising:
a first ink composition containing a first disperse dye and a first dispersant; and
a second ink composition containing a second disperse dye and a second dispersant,
wherein the first disperse dye is the same as the second disperse dye,
the content of the first disperse dye in the first ink composition is equal to or greater than the content of the second disperse dye in the second ink composition,
the ratio A of the content of the first dispersant in the first ink composition to the content of the first disperse dye in the first ink composition is equal to or greater than the ratio B of the content of the second dispersant in the second ink composition to the content of the second disperse dye in the second ink composition, and
each of the first dispersant and the second dispersant contains at least one compound selected from the group consisting of lithium and potassium salts of aromatic sulfonic acid, lithium and potassium salts of aromatic sulfonic acid-formalin condensates, lithium and potassium salts of β-naphthalenesulfonic acid, and lithium and potassium salts of β-naphthalenesulfonic acid-formalin condensates.

2. The ink jet ink set for sublimation transfer according to claim 1,
wherein each of the first ink composition and the second ink composition is any one of magenta ink, cyan ink, and black ink.

3. The ink jet ink set for sublimation transfer according to claim 1,
wherein the ratio of the content of the second disperse dye in the second ink composition to the content of the first disperse dye in the first ink composition is 5.0% to 50%.

4. The ink jet ink set for sublimation transfer according to claim 1,
wherein each of the ratio A and the ratio B is 50% to 200%.

TABLE 2

|  | First ink composition | | Second ink composition | | | | |
| --- | --- | --- | --- | --- | --- | --- | --- |
|  | Composition No. | Dispersant/ disperse dye | Composition No. | Dispersant/ disperse dye | Graininess | Bleeding | Clogging recovery performance |
| Ex. 1 | M-1 | 1 | LM-1 | 1 | B | B | B |
| Ex. 2 | M-1 | 1 | LM-2 | 1 | A | A | B |
| Ex. 3 | M-2 | 1 | LM-3 | 1 | A | A | B |
| Ex. 4 | M-3 | 1 | LM-4 | 1 | A | A | A |
| Ex. 5 | M-5 | 1 | LM-7 | 1 | A | A | B |
| Ex. 6 | M-5 | 1 | LM-2 | 1 | A | A | B |
| Ex. 7 | M-6 | 2 | LM-2 | 1 | A | A | B |
| Ex. 8 | M-6 | 2 | LM-8 | 2 | A | A | B |
| Ex. 9 | C-1 | 1 | LC-1 | 1 | B | B | B |
| Ex. 10 | C-1 | 1 | LC-2 | 1 | A | A | B |
| Ex. 11 | C-2 | 1 | LC-3 | 1 | A | A | B |
| Ex. 12 | C-3 | 1 | LC-4 | 1 | A | A | A |
| Ex. 13 | K-1 | 1 | LK-1 | 1 | B | B | B |
| Ex. 14 | K-1 | 1 | LK-2 | 1 | A | A | B |
| Ex. 15 | K-2 | 1 | LK-3 | 1 | A | A | B |
| Ex. 16 | K-3 | 1 | LK-4 | 1 | A | A | A |
| Comp. Ex. 1 | M-4 | 1 | LM-5 | 1 | A | A | C |
| Comp. Ex. 2 | M-1 | 1 | LM-6 | 10 | A | C | A |
| Comp. Ex. 3 | C-4 | 1 | LC-5 | 1 | A | A | C |
| Comp. Ex. 4 | C-1 | 1 | LC-6 | 10 | A | C | A |
| Comp. Ex. 5 | K-4 | 1 | LK-5 | 1 | A | A | C |
| Comp. Ex. 6 | K-1 | 1 | LK-6 | 10 | A | C | A |

5. The ink jet ink set for sublimation transfer according to claim 1,
wherein each of the first dispersant and the second dispersant further contains at least one compound selected from the group consisting of sodium salts of aromatic sulfonic acid, sodium salts of aromatic sulfonic acid-formalin condensates, sodium salts of β-naphthalenesulfonic acid, and sodium salts of β-naphthalenesulfonic acid-formalin condensates.

6. A method of manufacturing a dyed product, comprising:
adhering the first ink composition and the second ink composition included in the ink jet ink set for sublimation transfer according to claim 1 to an intermediate transfer medium utilizing an ink jet method; and
heating a surface of the intermediate transfer medium, the surface being adhered with the first ink composition and the second ink composition, and a dyed surface of a recording medium with these surfaces facing each other to transfer the disperse dye contained in the first ink composition and the second ink composition to the recording medium.

7. A method of manufacturing a dyed product, comprising:
adhering the first ink composition and the second ink composition included in the ink jet ink set for sublimation transfer according to claim 2 to an intermediate transfer medium utilizing an ink jet method; and
heating a surface of the intermediate transfer medium, the surface being adhered with the first ink composition and the second ink composition, and a dyed surface of a recording medium with these surfaces facing each other to transfer the disperse dye contained in the first ink composition and the second ink composition to the recording medium.

8. A method of manufacturing a dyed product, comprising:
adhering the first ink composition and the second ink composition included in the ink jet ink set for sublimation transfer according to claim 3 to an intermediate transfer medium utilizing an ink jet method; and
heating a surface of the intermediate transfer medium, the surface being adhered with the first ink composition and the second ink composition, and a dyed surface of a recording medium with these surfaces facing each other to transfer the disperse dye contained in the first ink composition and the second ink composition to the recording medium.

9. A method of manufacturing a dyed product, comprising:
adhering the first ink composition and the second ink composition included in the ink jet ink set for sublimation transfer according to claim 4 to an intermediate transfer medium utilizing an ink jet method; and
heating a surface of the intermediate transfer medium, the surface being adhered with the first ink composition and the second ink composition, and a dyed surface of a recording medium with these surfaces facing each other to transfer the disperse dye contained in the first ink composition and the second ink composition to the recording medium.

10. A method of manufacturing a dyed product, comprising:
adhering the first ink composition and the second ink composition included in the ink jet ink set for sublimation transfer according to claim 5 to an intermediate transfer medium utilizing an ink jet method; and
heating a surface of the intermediate transfer medium, the surface being adhered with the first ink composition and the second ink composition, and a dyed surface of a recording medium with these surfaces facing each other to transfer the disperse dye contained in the first ink composition and the second ink composition to the recording medium.

11. A dyed product, which is obtained utilizing the ink jet ink set for sublimation transfer according to claim 1.

12. A dyed product, which is obtained utilizing the ink jet ink set for sublimation transfer according to claim 2.

13. A dyed product, which is obtained utilizing the ink jet ink set for sublimation transfer according to claim 3.

14. A dyed product, which is obtained utilizing the ink jet ink set for sublimation transfer according to claim 4.

15. A dyed product, which is obtained utilizing the ink jet ink set for sublimation transfer according to claim 5.

* * * * *